United States Patent

Osawa et al.

[11] Patent Number: 4,773,770
[45] Date of Patent: Sep. 27, 1988

[54] LINEAR GUIDE APPARATUS

[75] Inventors: Nobuyuki Osawa; Shizuo Kashiwagi, both of Takasaki, Japan

[73] Assignee: Nippon Seiko Kabushiki Kaisha, Tokyo, Japan

[21] Appl. No.: 135,732

[22] Filed: Dec. 21, 1987

[30] Foreign Application Priority Data

Dec. 29, 1986 [JP] Japan .............................. 61-315643

[51] Int. Cl.⁴ .............................................. F16C 29/06
[52] U.S. Cl. .......................................... 384/45; 384/21
[58] Field of Search ....................... 384/45, 44, 49, 57, 384/21, 18

[56] References Cited

U.S. PATENT DOCUMENTS

| 4,101,178 | 7/1978 | Adams et al. | 384/21 |
| 4,549,773 | 10/1985 | Papp et al. | 384/21 |
| 4,614,382 | 9/1986 | Teramachi | 384/45 |
| 4,701,058 | 10/1987 | Mottate | 384/45 |

Primary Examiner—Lenard A. Footland
Attorney, Agent, or Firm—Basile and Hanlon

[57] ABSTRACT

A slider slidably mounted on a guide rail has a recess formed in the lower surface of the slider, and a pressure vessel made of elastic material is accommodated in the recess. A friction plate is attached to the lower surface of the pressure vessel to abut against the upper surface of the guide rail. Hydraulic pressure is exerted on the upper surface of the guide rail through the friction plate by the pressure vessel and is adjustable by a pressure control valve so as to vary the frictional resistance between the slider and the guide rail.

2 Claims, 2 Drawing Sheets

LINEAR GUIDE APPARATUS

BACKGROUND OF THE INVENTION

1. Field of the Invention

The present invention relates to a linear guide apparatus having a slider movable slidingly with respect to a guide rail, and in particular, to an improved linear guide apparatus in which it is made possible to control the frictional resistance between the guide rail and the slider.

2. Prior Art

Generally, a linear guide apparatus includes a guide rail, a slider movable along and guided by the guide rail, and many balls interposed between the guide rail and the slider. The slider moves slidingly and smoothly along the guide rail due to the rolling movement of the balls. However, since the sliding resistance of the slider is very small, it is sometimes difficult to stop the slider at a desired position. For this reason, braking means are provided between the slider and the guide rail.

Such linear guide apparatus are disclosed, for example, in Japanese Utility Model Laid-Open Publication No. 58-6010 (first prior art), and Japanese Patent Laid-Open Publication No. 61-11611 (second prior art) filed by the same applicant as the present application.

In the first prior art, a sliding bearing made of low friction material and loaded with a spring is interposed between a guide rail and a slider, so as to increase the frictional resistance between the guide rail and the slider to some degree and to provide a damping force at the time of stopping after the slider travels a predetermined distance.

On the other hand, in the second prior art, a friction member loaded with a spring member is provided on a surface of the slider opposing the guide rail. The friction member can be moved away from or brought into contact with the guide rail by means of a screw. Thus, in mounting the slider on the guide rail, the friction member is separated from the guide rail by the screw to facilitate assembly. After assembly, the screw member is removed so as to bring the friction member into contact with the guide rail, to press against the guide rail, so that a damping force is produced at the time of stopping the slider after it has travelled a predetermined distance.

However, in the first and second prior art, since the damping force at the time of stopping the slider is provided by the pressing force of the spring, there are drawbacks in that the damping force is fixed to a predetermined value and it is impossible to change the braking characteristics. Also, the pressing force of the spring is decreased due to deterioration with age and, as such, it become difficult to stop the slider at a fixed position. Furthermore, since there are variations in spring load, it is difficult to maintain the damping force at a predetermined value. Also, an unsolved problem is present in that the spring cannot be used positively as a brake in stopping the slider after it has travelled to a predetermined position. As a result, when the linear guide apparatus of the prior art is used in machine tools for performing heavy cutting, if the braking force is set to match the working condition a large braking force will be exerted even in such conditions in which the table returns to the original position without performing the work, or when the table makes access to the workpiece. Thus, a large loss of power will be caused when the table is moved rapidly, and also, since the load applied to the feed screw is large at the time of rapid feeding, the life of the machine will be short.

SUMMARY OF THE INVENTION

The present invention was made in view of the prblems in the prior art, and it is an object of the invention to provide a linear guide apparatus in which the braking force is adjustable so that substantially no braking force is exerted between a slider and a guide rail when the slider is travelling, and the braking force is effectively applied when the slider is to stop after travelling a predetermined distance.

In order to achieve the object, in a linear guide apparatus according to the present invention including a guide rail having a plurality of rolling member rolling grooves formed in the axial direction, a slider guided by the guide rail and having a plurality of rolling member rolling grooves respectively opposing the rolling member rolling grooves of the guide rail, and a plurality of rolling members inserted rollably in the rolling member rolling grooves of the slider and the guide rail, the improvement comrpises a recess formed in a surface of the slider opposing the guide rail, a pressing mechanism disposed in the recess for exerting a pressing force against a surface of the guide rail opposing to the slider, and pressing force adjusting means coupled to the pressing mechanism for adjusting the pressing force thereof.

In the present invention, the pressing mechanism is provided in the slider to exert a pressing force against the opposing surface of the guide rail, and the pressing force of the pressing mechanism is adjusted by the pressing force adjusting means. Thus, the pressing force of the pressing mechanism can be selected depending on the operating condition of the slider. When the pressing force is increased, to increase the friction resistance between the slider and the guide rail, the pressing mechanism can be used positively as a clamp at the time of stopping the slider. Furthermore, by adjusting the pressing force of the pressing mechanism, the resistance force of the pressing mechanism during normal travel of the slider can be made to be a predetermined value suitable for the movement, or can be made substantially null.

DESCRIPTION OF THE PREFERRED EMBODIMENTS

Figure 1:
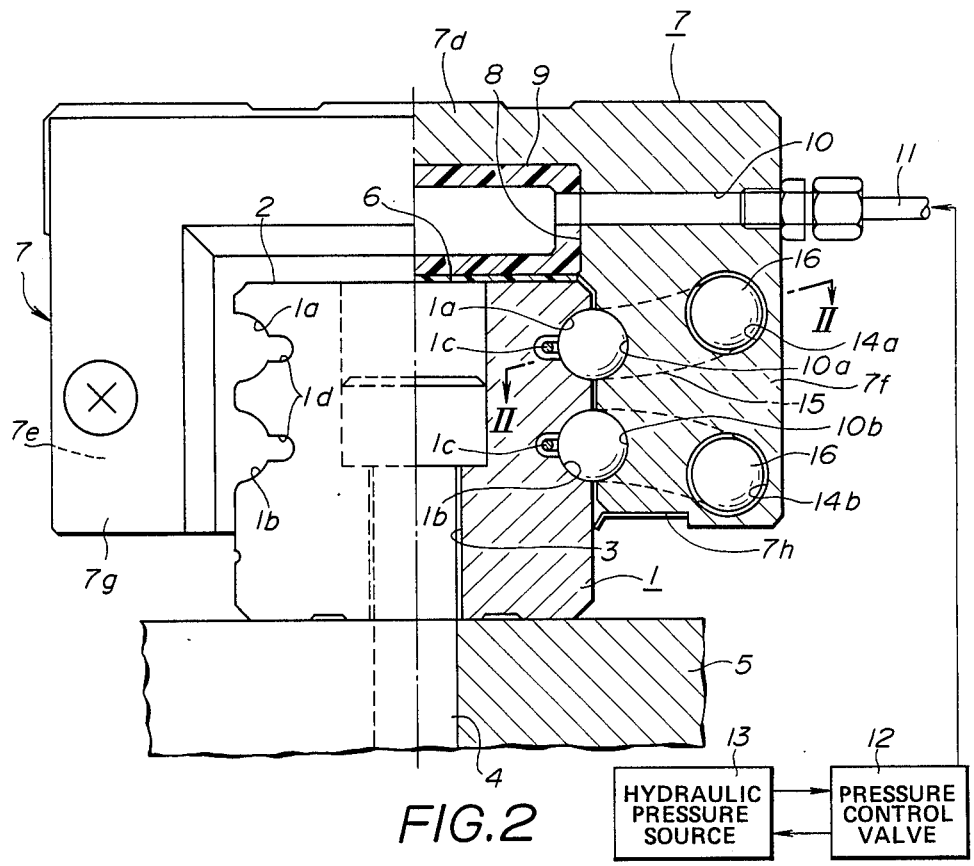
FIG. 1 is a front view of an embodiment of the invention with a half part in section.

Referring to FIG. 1, a guide rail 1 extends in an axial (longitudinal) direction. Attaching holes 3 are bored from an upper surface 2 of the guide rail 1 at predetermined intervals along the axial direction, and the guide rail 1 is secured to a stationary surface 5 by attaching bolts 4. In each of both lateral sides of the guide rail 1, there are formed two rolling member or ball rolling grooves 1a and 1b having a semi-circular cross section and spaced at a predetermined interval in the vertical direction. The ball rolling grooves 1a and 1b in both sides of the guide rail 1 are symmetrical, and extend in parallel to each other in the axial direction. In the bottom of each of the ball rolling grooves 1a, 1b, there is formed a retainer slot 1d for accommodating a retainer 1c made from piano wire or the like.

Figure 2:
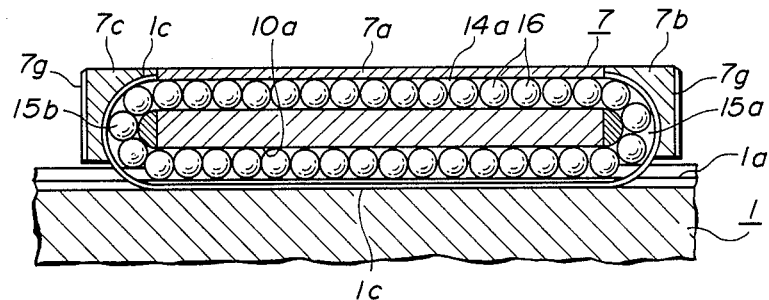
FIG. 2 is a sectional view taken along the line II—II in FIG. 1.

A slider 7 is slidably mounted on the guide rail 1. Referring to FIG. 2, the slider 7 includes a slider body 7a, hand end plates 7b and 7c for blocking opposite longitudinal ends of the slider body 7a. The slider body 7a is formed with upper plate portion 7d, and vertical plate portions 7e and 7f exending vertically downward from both lateral sides of the upper plate portion 7d. The slider body 7a has an inverted U-shaped cross section. A recess 8 is formed in a lower surface of the upper plate portion 7d. The recess 8 is defined, for example, by a cylindrical inner surface whose axis is in the vertical direction. A pressing mechanism, such as a liquid tight pressure vessel 9, also having a cylindrical shape and made of elastic material such as synthetic rubber, synthetic leather, thin-walled metal, or similar material, is accommodated in the recess 8. On the lower surface of the pressure vessel 9, there is provided a friction plate 6 made of a relatively rigid and hard wearing material such as metal, synthetic resin, or the like. The friction plate 6 is secured by bonding or the like. Furthermore, seal plates 7g are attached to the end plates 7b and 7c, and lower surface seals 7h are attached to the lower surfaces of the vertical plate portions 7e and 7f.

The pressure vessel 9 is in communication with a hydraulic pressure source 13 via a through bore 10 laterally penetrating the upper plate portion 7d. A flexible hydraulic piping 11, and a pressure control valve 12 serve as pressure force regulating means. The pressure within the pressure vessel 9 is controlled by controlling the pressure control valve 12; thereby regulating the pressing force exerted against the guide rail 1.

Ball rolling grooves 10a and 10b are formed in the inner surface of each of the vertical plate portions 7e and 7f at positions respectively corresponding to the ball rolling grooves 1a and 1b of the guide rail 1. The ball rolling grooves 10a and 10b also have a semi-circular cross section. Furthermore, ball return passages 14a and 14b having a circular cross section are formed within a thick wall portion of each of the vertical plate portions 7e and 7f in the axial direction. The ball return passages 14a and 14b correspond to the ball rolling grooves 10a and 10b, respectively. As shown in FIG. 2, the opposite ends of each of the ball return passages 14a and 14b are in communication with curved ball passages 15a and 15b. The curved ball passages 15a and 15b are spaces of a half doughnut shape formed in the end plates 7b and 7c, respectively. One end of each of the curved ball passages 15a and 15b of the ball return passage 14a is in communication with a corresponding end of a ball rolling path constituted by the ball rolling groove 1a of the guide rail 1 and the ball rolling groove 10a of the vertical plate portion 7f of the slider 7. In other words, a ball circulating path is formed by the ball return passage 14a and the curved ball passages 15a and 15b. This is also applicable to the ball return passage 14b. Multiple balls 16, constituting the rolling members, are inserted into the ball circulating paths, and into the ball rolling paths formed by the ball rolling grooves 1a, and 10a, and the ball rolling grooves 1b and 10b of the guide rail 1 and the slider 7. In this case, the balls 16 are fitted into the ball rolling paths and the balls 16 are loosely fitted into the ball circulating paths. Furthermore, the balls 16 are guided from the ball rolling paths to the curved ball passages 15a and 15b in the end plates 7b and 7c by the retainer 1c so that the balls 16 roll and circulate smoothly. The retainer 1c serves as means for preventing the balls 16 from falling off the slider 7.

The mounting of the slider 7 on the guide rail 1 is carried out with the hydraulic piping 11 disconnected from the through bore 10 of the slider 7. At this time, the pressure within the pressure vessel 9 is maintained at the atmospheric pressure. Thus, there is substantially no frictional resistance between the friction plate 6, of the pressure vessel 9, and the upper surface 2 of the guide rail 1. As such, the slider 7 can slide on the guide rail with a very slight force exerted to the slider 7. As a result, the mounting of the slider 7 on the guide rail 1 can be made easily. After the mounting of the slider 7 on the guide rail 1, the hydraulic piping 11 is connected to the slider 7.

In operation, when the slider 7, mounted on the guide rail 1, is moved, for example, backward in the axial direction, the balls 16 inserted between the ball rolling grooves 1a and 10a, and 1b and 10b of the guide rail 1 and the slider 7 roll due to the movement of the slider 7. The ball 16 move in the opposite direction to that of the slider 7. At the front end portion of the slider 7, the balls 16 are guided by the retainer 1c and enter the curved ball passage 15a of the end plate 7b. The balls 16 make a U-turn along the curved ball passage 15a to enter the ball return passage 14a. After passing through the ball return passage 14a, the balls 16 make another U-turn at the curved ball passage 15b of the end plate 7c, and move into the ball rolling path between the ball rolling grooves 1a and 10a of the guide rail 1 and the slider 7, thereby completing one full circulation. Owing to this movement of the balls 16, the slider 7 can be moved with a low force.

Under this condition, the hydraulic pressure source 13 is operated, and the hydraulic pressure applied to the pressure vessel 9 is suitably regulated by the pressure control valve 12 so that the pressure within the pressure vessel 9 is higher than the atmospheric pressure. The upper surface and side surfaces of the pressure vessel 9 are restricted by the recess 8 of the slider 7. As a result, the pressure within the pressure vessel 9 makes the lower surface of the pressure vessel 9 expand downward thereby pressing the friction plate 6 against the upper surface 2 of the guide rail 1. Accordingly, frictional resistance proportional to the pressure is produced between the friction plate 6, on the lower surface of the pressure vessel 9, and the guide rail 2.

Accordingly, by setting the pressure at a level near the atmospheric pressure, it is possible to move the slider 7 with a relatively small frictional resistance. When the pressure is increased, the frictional resistance is increased accordingly, and it is possible to attain an attenuating effect corresponding to the weight of the slider 7, and an article mounted on the slider 7, in the stopping condition after the movement of the slider 7. When the pressure set by the pressure control valve 12 is increased further, it is possible to make the pressure vessel 9 act as a brake for the slider 7, and at the same time, it is possible to fix and secure the slider 7 to the guide rail 1 when the slider 7 is in a stopped condition.

Furthermore, by decreasing the pressure of the pressure control valve 12 while the slider 7 is moving, and by increasing the pressure of the pressure control valve 12 at the time of completion of the movement, it is possible to perform the movement of the slider 7 with a low force, and to perform rapid braking when the slider 7 is to stop its movement.

Figure 3:
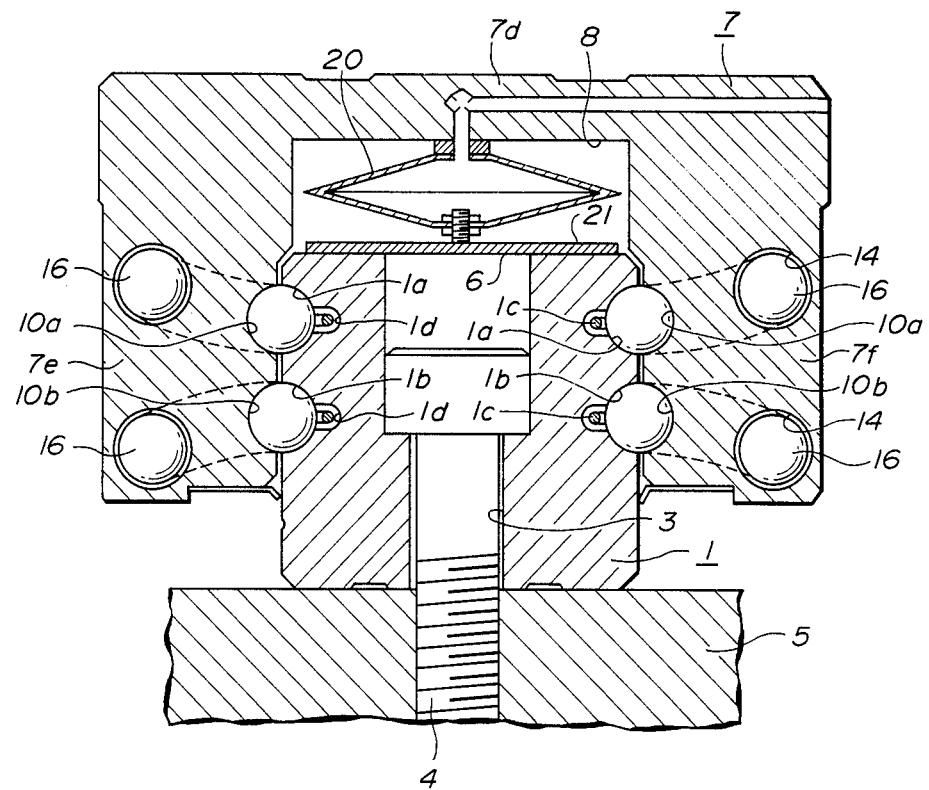
FIG. 3 is a sectional view of another embodiment of the invention.

In the above embodiment, although the pressure vessel 9 is used as the pressing mechanism, the present invention is not limited to this but, as shown in FIG. 3, a pressure vessel 20 having a pantagraph-shaped cross section and which is expandable vertically may be used with a friction plate 21 attached to the lower surface thereof. Furthermore, a bellows type pressure vessel is also applicable.

Alternatively, in place of the pressure vessel 9 or 20 accommodated in the recess 8, a plunger having a friction plate attached to the tip of a piston may be used. Further, the opening portion of the recess 8 of the slider 7 may be closed liquid-tightly by bonding a hard wearing elastic member including synthetic rubber, synthetic resin, synthetic leather, thin-walled metal, or other suitable material. Further, the operating fluid is not limited to the hydraulic oil, but water or other liquids, or air or other gases may be used. Also, the shape of the recess 8 is not limited to the cylindrical shape, and any arbitrary shape, including square, triangle or the like may be used.

Moreover, in the above embodiment, the pressing mechanism is provided in the slider 7 and is located so that it opposes the upper surface of the guide rail 1. However, the present invention is not limited to this configuration. The pressing mechanism may be provided in the vertical plate portion of the slider 7 such that the pressing mechanism opposes to the side of the guide rail 1 or the stationary portion 5.

The rolling members are not limited to the balls, but rollers or the like, may be used.

As described in the foregoing, in the present invention, a recess is formed in the surface of the slider opposing the guide rail, and pressing mechanism is disposed in the recess. The pressing force of the pressing mechanism is made adjustable by pressing force adjusting means, and by adjusting the pressing force of the pressing mechanism. The frictional resistance between the slider and the guide rail can be changed as desired. Thus, a damping effect can be achieved at the time of stopping the slider after movement. Moreover, when the slider is used as a travelling table of a machine tool or the like, it is possible to prevent power loss by adjusting the pressing force so that no frictional resistance is exhibited between the travelling table and the guide rail. At the same time, the life of the machine can be improved by reducing the load on the feed screw or the bearing supporting the feed screw. Furthermore, another advantage is provided in that by adjusting the pressing force, it is possible to positively exhibit a braking effect when the slider is to be stopped after travel, and it is also possible to firmly secure the slider to the guide rail.

While certain embodiments of the invention have been described in detail above in relation to linear guide apparatus, it will be apparent to those skilled in the art that the disclosed embodiment may be modified. Therefore, the foregoing description is to be considered exemplary rather than limiting, and the true scope of the invention is that defined in the following claims.

What is claimed is:

1. In a linear guide apparatus of the type having a guide rail with a plurality of rolling grooves formed in the axial direction, a slider guided by said guide rail and having a plurality of rolling grooves respectively opposing said guide rail, and a plurality of rolling members rollably carried in the rolling grooves of said slider and said guide rail, the improvement comprising:
   a recess formed in a surface of said slider opposing said guide rail;
   a pressing mechanism disposed in the recess for exerting a pressing force against a surface of said guide rail opposing said slider; and
   pressing force adjusting means coupled to said pressing mechanism for adjusting the pressing force thereof.

2. A linear guide apparatus according to claim 1, further comprising a friction plate having an elastic property and attached to a lower surface of said pressing mechanism so that said friction plate abuts against an upper surface of said guide rail.

* * * * *